(12) United States Patent
Kim

(10) Patent No.: US 9,383,852 B2
(45) Date of Patent: Jul. 5, 2016

(54) ELECTRONIC APPARATUS AND METHOD OF CONTROLLING THEREOF

(71) Applicant: Samsung Electronics Co., Ltd., Suwon-si, Gyeonggi-do (KR)

(72) Inventor: Se-joong Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/148,859

(22) Filed: Jan. 7, 2014

(65) Prior Publication Data

US 2014/0191999 A1    Jul. 10, 2014

Related U.S. Application Data

(60) Provisional application No. 61/750,403, filed on Jan. 9, 2013.

(30) Foreign Application Priority Data

Jul. 26, 2013    (KR) ........................ 10-2013-0089077

(51) Int. Cl.
*G06F 3/045* (2006.01)
*G06F 3/041* (2006.01)
*G06F 1/16* (2006.01)
*G06F 1/32* (2006.01)

(52) U.S. Cl.
CPC ............ *G06F 3/0412* (2013.01); *G06F 1/1616* (2013.01); *G06F 1/1677* (2013.01); *G06F 1/3206* (2013.01); *G06F 1/3262* (2013.01); *G06F 1/3265* (2013.01); *G06F 1/3287* (2013.01); *Y02B 60/1242* (2013.01); *Y02B 60/1282* (2013.01)

(58) Field of Classification Search
CPC ... G06F 1/1616; G06F 1/1677; G06F 1/3206; G06F 1/3262; G06F 1/3265; G06F 1/3287; G06F 3/0412; Y02B 60/1242; Y02B 60/1282
USPC ....................... 345/156, 173–178; 178/18.01, 178/18.03–18.11
See application file for complete search history.

(56) References Cited

U.S. PATENT DOCUMENTS

| | | | |
|---|---|---|---|
| 7,428,142 B1 * | 9/2008 | Ligtenberg et al. | 361/679.55 |
| 2001/0037470 A1 * | 11/2001 | Teshima et al. | 713/320 |
| 2005/0156922 A1 * | 7/2005 | Lee | 345/211 |
| 2012/0131365 A1 * | 5/2012 | Tabone et al. | 713/320 |
| 2013/0321288 A1 * | 12/2013 | Adamson et al. | 345/173 |

FOREIGN PATENT DOCUMENTS

KR    1020060080801    7/2006

* cited by examiner

*Primary Examiner* — Kent Chang
*Assistant Examiner* — Nelson Rosario
(74) *Attorney, Agent, or Firm* — Staas & Halsey LLP

(57) ABSTRACT

An electronic apparatus and a method of controlling thereof includes a main body, a display unit configured to be combined with the main body to pivot to be opened and closed and having a touch panel and a display panel, a sensor configured to sense a closed state of the display unit with respect to the main body, and a controller configured to, if the display unit is changed from an opened state to the closed state, stop an operation of the touch panel and then stop an operation of the display panel.

24 Claims, 9 Drawing Sheets

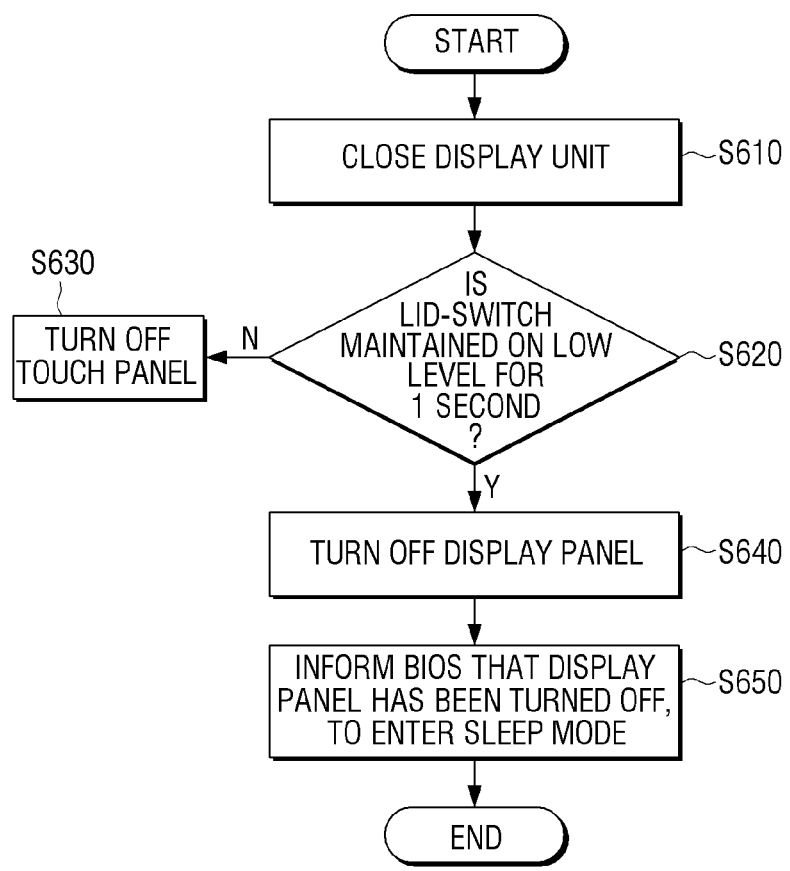

ELECTRONIC APPARATUS AND METHOD OF CONTROLLING THEREOF

CROSS-REFERENCE TO RELATED APPLICATIONS

This application claims priority under 35 U.S.C. §119 from U.S. Provisional Patent Application No. 61/750,403, filed on Jan. 9, 2013, in the United States Patent and Trademark Office, and Korean Patent Application No. 10-2013-0089077, filed on Jul. 26, 2013, in the Korean Intellectual Property Office, the disclosure of which is incorporated herein by reference in its entirety.

BACKGROUND OF THE INVENTION

1. Field of the Invention

The present general inventive concept generally relates to providing an electronic apparatus and a method of controlling thereof, and more particularly, to providing an electronic apparatus that senses a closed state of a display unit having a touch panel and a display panel to respectively control operations of the touch panel and the display panel, and a method of controlling thereof.

2. Description of the Related Art

Various types of electronic products have been developed and supplied with the development of recent technologies. In particular, according to demands of users, there have been developed an electronic apparatus that includes a touch panel enabling a touch input and a display panel.

The touch panel may be realized as a capacitive type or a decompression type.

When a surface of the capacitive type touch panel is touched by a part of the body of a user, the capacitive type touch panel senses micro-electricity, which is excited into the body of the user, to calculate a touch coordinate. If the user touches a screen of the decompression type touch panel, the decompression type touch panel senses a current that flows due to a contact between upper and lower plates of a touched point of the screen, to calculate a touch coordinate.

An electronic apparatus, which has an apparatus structure capable of closing a display unit like a Clamshell type NOTE-PC of NOTE-PCs, basically interrupts power of the display unit and executes a sleep mode if the display unit is closed. However, to cope with a time when the user closes the display unit and then immediately opens the display unit, the above-described operation is basically performed when a predetermined time is maintained from a time when the closed state of the display unit is recognized.

Only if the predetermine time is maintained even when the display unit is closed, the power of the display unit is interrupted. Therefore, if the display unit including the touch panel is closed, the apparatus structure disposed in an upper part of a main body contacts the display unit, and thus a touch that a user does not want may be input.

SUMMARY OF THE INVENTION

The exemplary embodiments provide an electronic apparatus that senses a closed state of a display unit having a touch panel and a display panel to respectively control operations of the touch panel and the display panel in order to prevent a touch input that a user does not want, and a method of controlling thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic apparatus including a main body, a display unit configured to be combined with the main body to pivot to be opened and closed, and having a touch panel and a display panel, a sensor configured to sense a closed state of the display unit with respect to the main body, and a controller configured to, if the display unit is changed from an opened state to the closed state, stop an operation of the touch panel and then stop an operation of the display panel.

The sensor may sense a magnetism of a magnet of the display unit to sense the opened and closed states of the display unit with respect to the main body.

The sensor may sense a relative angle of a hinge that connects the main body and the display unit to each other, to sense the opened and closed states of the display unit with respect to the main body.

If the display unit is changed from the opened state to the closed state, the controller may stop the operation of the touch panel, maintain the closed state for a predefined time, and stop the operation of the display panel.

The controller may stop the operation of the display panel and inform a basic input output system (BIOS) of the electronic apparatus that the operation of the display unit has been stopped, to enter a sleep mode.

The electronic apparatus of claim 1, wherein if the display unit is changed from the closed state to the opened state, the controller resumes the operations of the touch panel and the display panel.

The controller may generate a control signal to interrupt an input of the touch panel or interrupt power of the touch panel to stop the operation of the touch panel.

The controller may generate a control signal to interrupt an input of a signal output to the display panel or interrupt power of the display panel to stop the operation of the display panel.

The controller may be realized as a microcomputer circuit.

The foregoing and/or other features and utilities of the present general inventive concept may also be achieved by providing a method of controlling an electronic apparatus including a main body and a display unit configured to be combined with the main body to pivot to be opened and closed and having a touch panel and a display panel. The method may include sensing a closed state of the display unit with respect to the main body, if the display unit is changed from an opened state to the closed state, stopping an operation of the touch panel, and after stopping the operation of the touch panel, stopping an operation of the display panel.

A magnetism of a magnet of the display unit may be sensed to sense the opened and closed states of the display unit with respect to the main body.

A relative angle between the main body and the display unit may be sensed to sense the opened and closed states of the display unit with respect to the main body.

After a predefined time elapses from a time when the display unit is changed from the opened state to the closed state, the operation of the display panel may be stopped.

The method may further include stopping the operation of the display panel and informing a BIOS that the operation of the display panel has been stopped, to enter a sleep mode.

The method may further include if the display unit is changed from the closed state to the opened state, resuming the operations of the touch panel and the display panel.

A control signal to interrupt an input of the touch panel may be generated or power of the touch panel may be interrupted to stop the operation of the touch panel.

A control signal to interrupt an input of a signal output to the display panel may be generated or power of the display panel may be interrupted to stop the operation of the display panel.

The foregoing and/or other features and utilities of the present general inventive concept may also be achieved by providing a non-transitory computer-readable recording medium containing computer-readable medium as a program to execute the method describe above or hereinafter.

The foregoing and/or other features and utilities of the present general inventive concept may also be achieved by providing an electronic apparatus including a main body, a display unit combined with the main body, and having a touch panel and a display panel, and a controller configured to differently control operations of the touch panel and the display panel of the display unit according to a state of the display unit with respect to the main body.

When the display unit is in a closed state with respect to the main body, the controller may deactivate an operation of the touch panel of the display unit at a first time and may deactivate an operation of the display panel of the display unit at a second time.

When the display unit is in a closed state with respect to the main body, the controller may stop an operation of the touch panel at a first time and then stop an operation of the display panel at a second time after stopping the operation of the touch panel.

When the display unit is in a closed state with respect to the main body, the controller may terminate a power supply to the touch panel at a first time and then terminate a power supply to the display panel at a second time.

When the display unit is changed from a closed position to an open position within a predetermined time period after the display unit has been changed from the open position to the closed position, the controller may control the touch panel without controlling the display panel.

The controller may stop an operation of the touch panel and then resume the operation of the touch panel without stopping and resuming an operation of the display panel.

The electronic apparatus may further include a sensor disposed to detect the state of the display unit with respect to the main body. The sensor may detect at least one of an angle between the display unit and the main body, a distance between a portion of the display unit and a portion of the main body, and a state of a hinge connecting the display unit and the main body to each other, as the state of the display unit.

The electronic apparatus may further include a sensor disposed to detect the state of the display unit with respect to the main body, and the sensor and the controller may be are disposed at the main body.

The controller may control a sleep mode to be entered after the touch panel is controlled in response to the state of the display unit.

The display panel may be controlled before or after the sleep mode.

The foregoing and/or other features and utilities of the present general inventive concept may also be achieved by providing an electronic apparatus including a main body, a display unit movable with respect to the main body, and having a panel with an input function and a display function, and a controller configured to differently control the input function of the panel and the display function of the panel of the display unit according to a state of the display unit with respect to the main body.

The controller may deactivate the input function of the panel and maintain the display function within a period of time when the state of the display unit is detected.

The controller may deactivate the display function and maintain the deactivation of the input function of the panel after a period of time after the state of the display unit is detected.

The input function and the display function may be simultaneously activated when the electronic apparatus is turned on, and the input function and the display function may be differently deactivated according to the state of the display unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 6 is a flowchart illustrating a method of controlling an electronic apparatus according to an exemplary embodiment of the present general inventive concept.

DETAILED DESCRIPTION OF THE PREFERRED EMBODIMENTS

Figure 1:
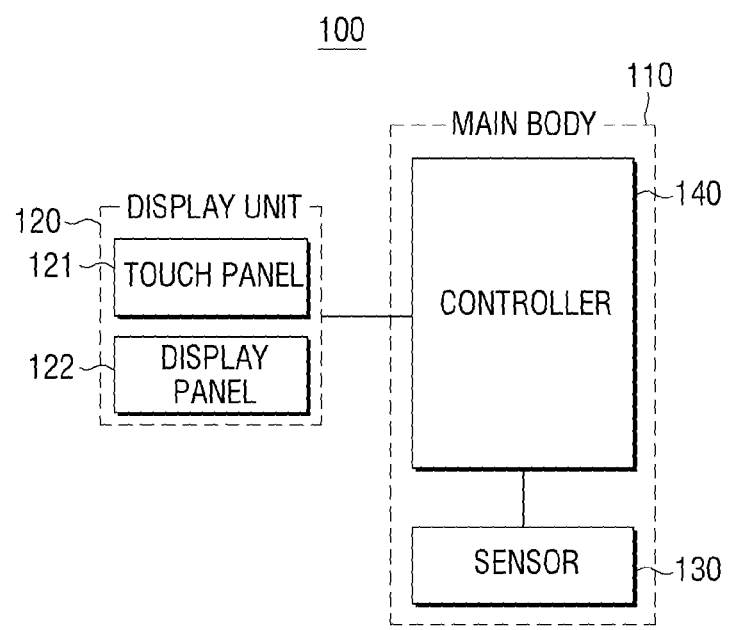
FIG. 1 is a block diagram illustrating an electronic apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

In the present specification, an electronic apparatus may be realized as a type such as a laptop computer, a tablet personal computer (PC), a portable multimedia player (PMP), a personal digital assistant (PDA), a portable phone, a digital frame, a game machine, or the like having a folded structure.

FIG. 1 is a block diagram illustrating an electronic apparatus 100 according to an exemplary embodiment of the present general inventive concept.

Referring to FIG. 1, the electronic apparatus 100 may include a main body 110 and a display unit 120. The main body 110 and the display unit 120 may communicate with each other according to a wired or wireless method.

The main body 110 and the display unit 120 may be physically connected to each other by using a mechanical structure, for example, a hinge. In detail, the hinge may include a shaft to provide a rotation operation to respectively pivot the main body 110 and the display unit 110 when the main body 110 and the display unit 120 are combined with each other. The hinge may be realized as one or more single bodies that are respectively connected to the main body 110 and the display unit 120 or may be realized to a single body having a plurality of connecting ends disposed at a central area between the main body 110 and the display unit 120.

The display unit 120 is combined with the main body 110 to pivot and be closed and opened with respect to the main body 110 and includes a touch panel 121 and a display panel 122.

The touch panel 121 is a device that senses an operation of pressing or touching the touch panel 121 through a body of a user (for example, a user finger including a thumb) or a sensing element (for example, a stylus pen) to input pointing information into the electronic apparatus 100.

The touch panel 121 may be realized as a capacitive type or a decompression type. The capacitive type touch panel senses micro-electricity, which is excited through the body of the user when a portion of the body of the user touches a surface of the display panel 120, by using a dielectric coated on the surface of the display unit 120 to calculate a touch coordinate.

The decompression type touch panel includes two electrode planes to sense a current flowing due to a contact between upper and lower plates of a touch point in order to calculate a touch coordinate if the user touches a screen of the decompression type touch panel 121.

As described above, the touch panel 121 may be realized as various types.

The display panel 122 displays an image under control of a controller 140 of the main body 110 of the electronic apparatus 100. For example, the display panel 122 may include an organic light emitter that includes a plurality of pixel cells and an electrode layer that covers both surfaces of the organic light emitter. In this case, a driver (not illustrated) of the display panel 122 may include a plurality of transistors respectively corresponding to the pixel cells of the display panel 122. The controller 140 applies an electrical signal to gates of the transistors to emit light from the pixel cells connected to the transistors so that an image may be displayed thereon.

Alternatively, the display panel 122 may be realized as an electroluminescence (EL) panel, an electrophoretic display (EPD), an electrochromic display (ECD), a liquid crystal display (LCD), an active matrix LCD (AMLCD), a plasma display panel, or the like.

The touch panel 121 and the display panel 122 may be formed as a single monolithic body. The touch panel 121 and the display panel 122 may be separate elements to be combined as a unit to display an image and to receive a user input. An operation of displaying an image and an operation of receiving a user input can be simultaneously performed.

The touch panel 121 and the display panel 122 receive a power supply from a power supply unit (not illustrated). It is possible that the touch panel 121 and the display panel 122 separately receive corresponding power supplies from a power supply unit. The controller 140 may control the power supply of the power supply unit. The touch panel 121 and the display panel 122 communicate with the controller 140 to receive or transmit date or to perform an activation operation, a deactivation operation, and/or an input or display operation.

The main body 110 may further include a sensor 130 in addition to the controller 140. The sensor 130 may be an electrical sensor (switch), a magnetic sensor (switch), or a mechanical sensor (switch), etc. to detect a relationship between the main body 110 and the display unit 120.

The sensor 130 senses a state of the display unit 120 with respect to the main body 110. The state of the display unit 120 with respect to the main body 110 may include one or more states including an open state and a closed state. In other words, the sensor 130 may sense that the display unit 120 pivots on the hinge to be opened (open) and closed.

In the closed state, the display unit 120 and the main body 110 may be folded, the display unit 120 may be disposed to face a major surface of the main body 110, or a predetermined angle may be formed between the display unit 120 and the main body 110. In the open state, the display unit 120 and the main body 110 may be disposed at a position other than the closed state. According to the state of the display unit 1120 with respect to the main body 110, the touch panel 121 and the display panel 122 may operate to be activated or deactivated, to be supplied with a power, or to be disconnected from a power according to a user or design preference according to an embodiment of the present general inventive concept.

The sensor 130 may sense magnetism of a magnet of the display unit 120 to sense the opened and closed and states of the display unit 120.

The sensor 130 may be realized as a lid switch circuit, and the display unit 120 may include the magnet. In this case, if the sensor 130 senses an amount of the magnetism from the magnet of the display unit 120 according to a distance or angle therebetween, and the sensed amount is a predetermined amount or more, the lid switch circuit of the sensor 130 may change a signal level thereof. In other words, if the display unit 120 pivots to be closer to the main body 110, the lid switch circuit may change the signal level to sense the closed state of the display unit 120. The controller 140 may determine a state of the display unit 120 with respect to the main body 110 to control the touch panel 121 and the display panel 122.

The sensor 130 may sense a relative angle of the hinge connecting the main body 110 and the display unit 120 to each other to determine a state, for example, the opened and closed states of the display unit 120. Here, the relative angle is referred to as an angle between the main body 110 and the display unit 120.

The sensor 130 may include a hinge sensor to detect the angle between the main body 110 and the display unit 120. The hinge sensor may include one of a hall sensor, a pressure sensor, an induction detection sensor, an electric contact sensor, and an optical sensor to detect a motion and a relative position of the hinge in order to determine a relationship between the main body 110 and the display unit 120. The relative position may be an angle between the main body 110 and the display unit 120. If the angle between the main body 110 and the display unit 120 is between 0° and 15°, for example, the sensor 130 may sense that the display unit 120 is in a closed state. Although the angle corresponding to the closed state is between 0° and 15° to correspond to the closed state in the above description, but the present general inventive concept is not limited thereto. The angle may be adjusted by a user or design preference. It is possible that the angle may be less than 10 degrees to correspond to the closed state.

When the controller 140 receives a signal indicating that the angle is less than or greater than a predetermined angle, the controller 140 may determines a state according to the received signal from the sensor 130. According to the determination, the controller 140 may control at least one of an activating or deactivating operation or a power on or off operation of components (elements) of the display unit 120.

If the display unit 120 is changed from the opened state into the closed state, the controller 140 stops an operation of the touch panel 121 and then stops an operation of the display panel 122. If the sensor 130 senses that the display unit 120 is changed from the opened state to the closed state, the controller 140 may stop the operation of the touch panel 121 and then stop the operation of the display panel 122 a predetermined time after the operation of the touch panel 121 stops in a condition that the state of the display unit 120 is not changed from the closed state to the open state.

Here, in order to stop the operation of the touch panel 121, the controller 140 may generate a control signal to interrupt an input of the touch panel 121 or may interrupt a power of the touch panel 121 to stop the operation of the touch panel 121. The control signal to interrupt the input of the touch panel 121 may be transmitted to a basic input output system (BIOS) to prevent the input of the touch panel 121 through a software program.

In detail, if the sensor 130 applies a signal indicating the closed state of the display unit 120, the controller 140 may interrupt the BIOS. Therefore, the BIOS may execute a code disabling the operation of the touch panel 121 to interrupt the input of the touch panel 121.

Also, in order to stop the operation of the display panel 122, the controller 140 may generate a control signal to interrupt an input of a signal output to the display panel 122 or may interrupt a power of the display panel 122 to stop the operation of the display panel 122.

In detail, if the sensor 130 applies a signal indicating the closed state of the display unit 120, the controller 140 may operate a timer that is set to a predefined time to, if the signal indicating the closed state of the display unit 120 is maintained for a predefined time, generate a control signal in order to interrupt the power of the display panel 122.

The controller 140 may interrupt the operation of the display panel 122 and simultaneously inform the BIOS of the electronic apparatus 100 of the interruption of the operation of the display panel 122 so as to enter a sleep mode. In this case, the electronic apparatus 100 may enter the sleep mode to interrupt a power of one or more elements (units) of the electronic apparatus 100 or may minimize a power consumption such as a reduction in a clock speed of a central processing unit (CPU), etc.

If the display unit 120 is changed from the closed state to the opened state, the controller 140 may resume the operations of the touch panel 121 and the display panel 122 or may control a power supply to the touch panel 121 and the display panel 122.

The controller 140 may include a microcomputer circuit and may be realized by connecting elements, such as the CPU, a read only memory (ROM), a random access memory (RAM), etc. for controlling the elements of the electronic apparatus 100, to one another through an internal bus.

As described above, the electronic apparatus 100 according to the present exemplary embodiment may sense the closed state of the display unit 120 including the touch panel 121 and the display panel 122 to respectively control operations of the touch panel 121 and the display panel 122 such that a undesirable touch input from the touch panel 121 is prevented in the closed state. Therefore, a function of the touch panel 121 is turned off while a function of the display panel 122 is turned on for a predetermined time period. When a state of the display unit 120 is changed from the closed state to the open state during the predetermined period, the function of the touch panel is turned on while the function of the display panel 122 is maintained. That is, a power supply or data of the touch panel 121 may be turned off or controlled in response to the closed state when a power supply or data of the display panel 122 is not turned off or controlled or when the power supply or data of the display panel 122 is maintained.

The electronic apparatus 100 may also stop the operation of the touch panel 121 immediately after sensing the closed state of the display unit 120, to prevent an undesirable input. Also, only if a predefined time is satisfied, the electronic apparatus 100 may stop the operation of the display panel 122. Therefore, if the user closes the display unit 120 and then immediately opens the display unit 120 within a predetermined time period, the electronic apparatus 100 may be used without a delay.

Figure 2:
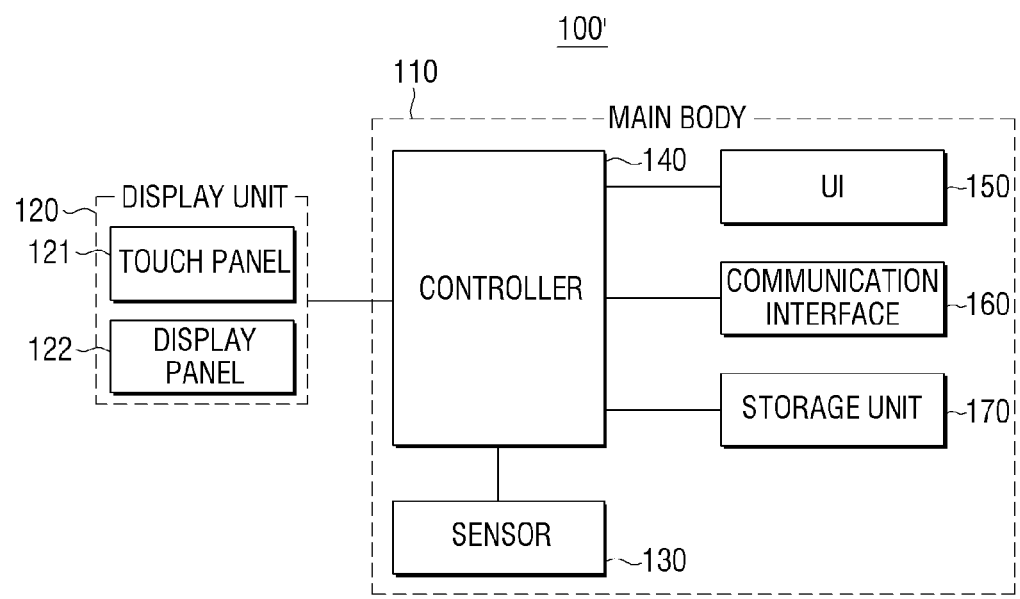
FIG. 2 is a block diagram illustrating an electronic apparatus according to an exemplary embodiment of the present general inventive concept.

FIG. 2 is a block diagram illustrating an electronic apparatus 100' according to an exemplary embodiment of the present general inventive concept.

Referring to FIG. 2, the electronic apparatus 100' may be similar to the electronic apparatus 100 of FIG. 1. The electronic apparatus may further include a user interface (UI) 150, a communication interface 160, and a storage unit 170 in addition to the elements (units) of the electronic apparatus 100 of FIG. 1.

The display unit 120, the touch panel 121, the display panel 122, the sensor 130, and the controller 140 have been described in detail with reference to FIG. 1, and thus their repeated descriptions are omitted herein.

The UI 150 is an element that performs an input and an output of the electronic apparatus 100. In detail, the UI 150 may receive an input signal from an input unit, such as a mouse, a keyboard, or a joystick, and a wireless input unit such as a remote controller or the like and transmit the input signal to the controller 140. Alternatively, the UI 150 may output various types of signals or data generated by the controller 140 to an external apparatus.

The display unit 120 has been described as an additional element to or a separate element from the UI unit 150 in the present general inventive concept. However, the display unit 120 may receive a user touch through the touch panel 121 and output an image through the display panel 122. Therefore, the display unit 120 may be realized as an element of the UI 150.

The communication interface 160 is an element that transmits and receives information with the external apparatus by using various types of wire/wireless communication methods. Here, the external apparatus may include at least one of another electronic apparatus, a portable phone, a tablet PC, a computer server, and a digital TV, and these apparatuses may be connected to the electronic apparatus 100 through a communication network.

The communication interface 160 may include a connector that includes at least one of a wireless communication module, such as a cellular communication module, a wireless local area network (WLAN) module, a near field communication (NFC) module, a global positioning system (GPS) communication module, a broadcasting communication module, or the like, and a wire communication module such as a high-definition multimedia interface (HDMI), a universal serial bus (USB), Institute of Electrical and Electronics Engineers (IEEE) 1294, or the like.

The storage unit 170 is an element that stores various types of programs and data such as a BIOS, an operating system (OS), an application, etc. In detail, the storage unit 170 stores the BIOS to control an operation of the electronic apparatus 100. If the electronic apparatus 100 is turned on, the stored BIOS is read from the storage unit 170 and the read BIOS is compiled to operate elements of the electronic apparatus 100.

The storage unit 170 may store an application program that is managed by the OS and performs the operation of the electronic apparatus 100 by using resources of the OS and various types of multimedia data and content data processed by the controller 140, data received from an external source, etc.

Figure 3:
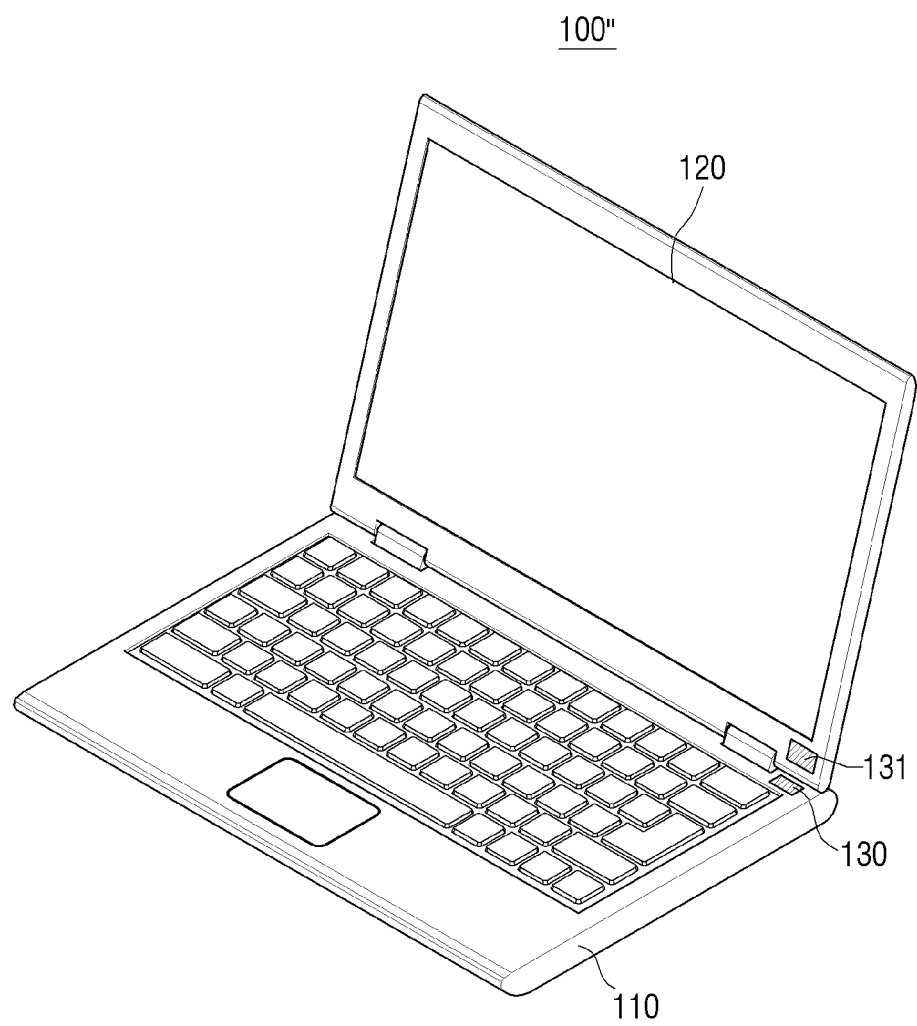
FIG. 3 is a view illustrating an electronic apparatus according to an exemplary embodiment of the present general inventive concept.
Figure 4:
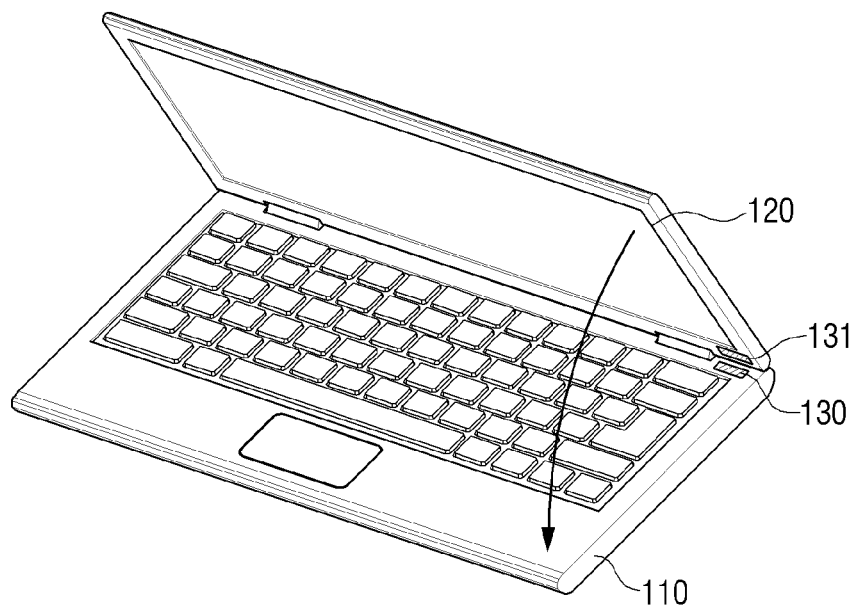
FIG. 4 is a view illustrating an operation of controlling the electronic apparatus of FIG. 3 according to an exemplary embodiment of the present general inventive concept.

FIGS. 3 and 4 are views illustrating an electronic apparatus 100" according to an exemplary embodiment of the present general inventive concept.

In FIGS. 3 and 4, the electronic apparatus 100" is described as a computer apparatus, such as a Note-PC. The electronic apparatus 100" may be similar to the electronic apparatus 100 of FIG. 1 or the electronic apparatus 100' of FIG. 2. Also, in FIGS. 3 and 4, the sensor 130 is described as a lid switch circuit that senses a closed state by using magnetism, for example.

Referring to FIG. 3, the main body 110 and the display unit 120 are connected to each other by using a hinge 100*a* to respectively pivot. The sensor 130 is disposed in the main body 110 to sense the closed state of the display unit 120.

If the display unit 120 pivots to be closed as illustrated in FIG. 4, the sensor 130 may be installed in the display unit 120 to sense the magnetism of a magnet 131 in order to sense the closed state of the display unit 120.

Figure 5:
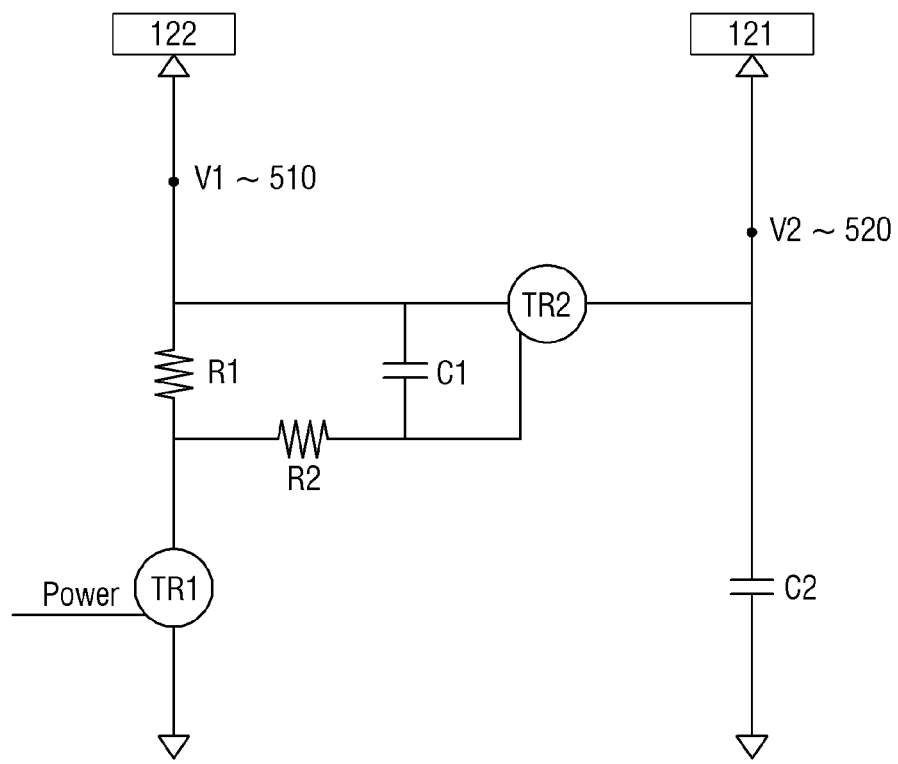
FIGS. 5, 5A, and 5B are views illustrating circuit diagrams included in a controller of an electronic apparatus according to an exemplary embodiment of the present general inventive concept.

FIG. 5 is a view illustrating a circuit diagram included a controller 140 of an electronic apparatus according to an exemplary embodiment of the present general inventive concept.

FIG. 5 illustrates a power division circuit unit to drive and control operations of the touch panel 121 and the display panel 122 according to an exemplary embodiment of the present general inventive concept.

Figure 5A:
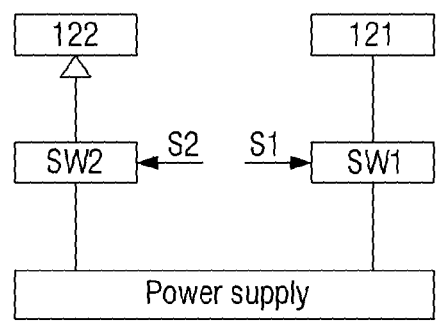
Figure 5B:
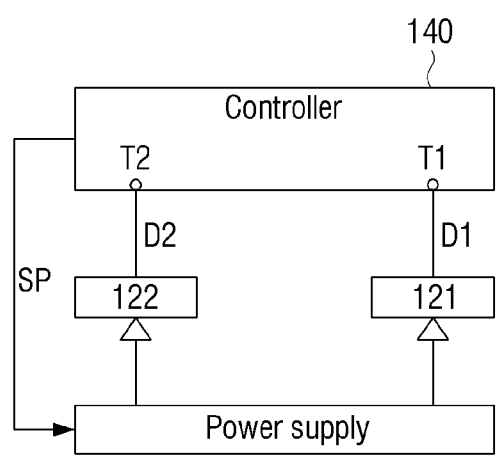

Referring to FIG. 5, the power division circuit unit may divide a power of a power supply unit (not illustrated) into a power 510 of the display panel 122 and a power 520 of the touch panel 121. In detail, the power division circuit unit may be a switch circuit TR1 that outputs the power 520 of the touch panel 121 through an input of the power 510 of the display panel 122. Here, the sensor 130 may control turning on and/or off of switches SW1 and SW2 of the switch circuit through a signal S1 and/or S2 indicating the closed state of the display unit 120 as illustrated in FIG. 5A. If the sensor 130 applies the signal indicating the closed state of the display unit 120, the power division circuit interrupts the power 520 of the touch panel 121. It is possible that the controller 140 generates a power control signal Sp to the power supply including a switch circuit to control (turn on or off) a power supply to the touch panel 121 and the display panel 122 as illustrated in FIG. 5B. It is also possible that the controller 140 may control signals D1 and/or D2 transmitted to or received from the touch panel 121 and/or the display panel 122 through terminals T1 and/or T2, respectively.

A sensor signal generated from the sensor 130 may be usable to control the switches of the switch circuit or to control the data D1 and D2 of the touch panel 121 and the display panel 122. It is also possible that a control signal generated from the controller 140 in response to the sensor signal of the sensor 130 can be usable to control the switches of the switch circuit or to control the data D1 and D2 of the touch panel 121 and the display panel 122.

FIG. 6 is a flowchart illustrating a method of controlling the electronic apparatus 100, according to an exemplary embodiment of the present general inventive concept.

Referring to FIG. 6, in operation S610, a display unit is closed. In this case, a state (a voltage) of a switch (a lid switch) may be changed from a high level to a low level in operation S620. If the voltage of the lid switch is changed from the high level to the low level in operation S620, a touch panel is turned off in operation S630.

If the voltage of the lid switch is maintained as the low level for 1 or more seconds in operation S620, the controller 140 turns off a display panel in operation S640. In operation S650, the controller 140 generates a signal to inform a BIOS that the display panel has been turned off, to enter a sleep mode.

When the closed state of the display unit is sensed, an operation of the touch panel is turned off, and thus an undesirable or unintended input caused by a touch may be prevented.

Although the sleep mode is activated in the operation S650 after the display panel is turned off in operation S640, the present general inventive concept is not limited thereto. It is possible that the entering of the sleep mode of operation S650 can be performed before the turning off of the display panel of operation S640 is performed. It is also possible that the entering of the sleep mode of operation S650 and the turning off of the display panel of operation S640 can be performed simultaneously. In this case, the controller may inform the BIOS of the turning off of the touch panel so that the entering of the sleep mode and the turning off the display panel can be performed after the turning off of the touch panel.

The method as described with reference to FIG. 6 may be performed by the electronic apparatus 100 having the structure of FIG. 1 or other electronic apparatuses having other types of structures.

Figure 7:
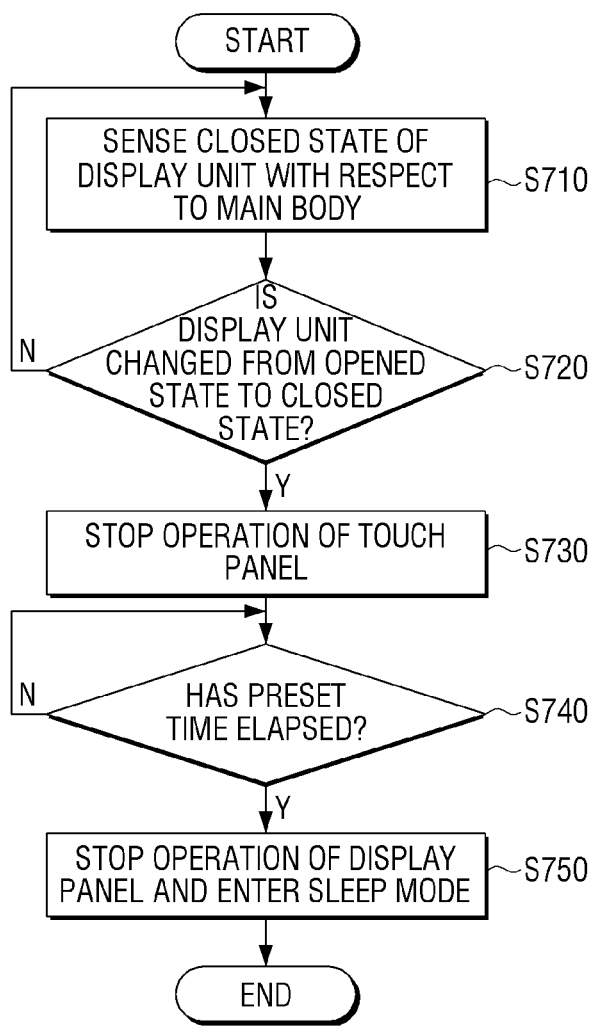
FIG. 7 is a flowchart illustrating a method of controlling an electronic apparatus according to an exemplary embodiment of the present general inventive concept.

FIG. 7 is a flowchart illustrating a method of controlling an electronic apparatus according to an exemplary embodiment of the present general inventive concept. Hereinafter, the electronic apparatus 100 of FIG. 1 may be useable as the electronic apparatus of FIG. 7, for example.

Referring to FIG. 7, in operation S710, the electronic apparatus 100 senses a closed state of a display unit with respect to a main body.

Here, the electronic apparatus 100 may sense magnetism of a magnet of the display unit to sense the closed state or may sense a relative angle of a hinge connecting the main body and the display unit to each other to sense the closed state of the display unit.

If the display unit is changed from an opened state to the closed state in operation S720, the electronic apparatus 100 stops an operation of a touch panel in operation S730.

The electronic apparatus 100 may generate a control signal for interrupting an input of the touch panel or may interrupt power of the touch panel in order to stop an operation of the touch panel.

After stopping the operation of the touch panel, the electronic apparatus 100 stops an operation of a display panel. In detail, if a predefined time elapses from a time when the display unit is changed from the opened state to the closed state in operation S740, the electronic apparatus 100 stops the operation of the display panel and enters a sleep mode in operation S750.

If the display unit is changed from the closed state to the opened state, the electronic apparatus 100 may resume the operations of the touch panel and the display panel.

The method of FIG. 7 may be performed by the electronic apparatus 100 having the structure of FIG. 1 or other types of electronic apparatuses having other types of structures.

As described above, according to various exemplary embodiments of the present general inventive concept, there may be provided a method of controlling an electronic apparatus. The method senses a closed state of a display unit including a touch panel and a display panel to respectively control operations of the touch panel and the display panel in order to prevent a touch input that a user does not want.

According to an embodiment of the present general inventive concept, the electronic apparatus may turn on the touch panel and the display panel according to a simultaneous operation but may turn off the touch panel and the display panel according to different operations or different times.

According to an embodiment of the present general inventive concept, the electronic apparatus may activate operations the touch panel and the display panel according to a simultaneous operation, but may deactivate the operations of the touch panel and the display panel according to different operations or different times.

It is also possible that the touch panel can be turned off and on without turning off the display panel when the display unit is changed from a closed position to an open position within a predetermine time after the display unit is changed from the open position to the closed position.

In a case where the display unit is formed with a single integrated panel having an input function (correspond to the touch panel) and a display function (corresponding to the display panel), it is possible that the input function and the display function of the panel can be controlled or deactivated differently, such as different times, when the display unit is in a closed position. When the input function requires a first potential and the display function requires a second potential, the first potential may be disabled as the deactivated method of the input function of the panel.

Methods according to the various exemplary embodiments of the present general inventive concept may be programmed and stored on various types of storage media. Therefore, the methods may be embodied on various types of electronic apparatuses that execute the storage media.

In detail, according to an exemplary embodiment of the present general inventive concept, there may be provided a non-transitory computer-readable medium that stores a program performs sensing a closed state of a display unit with respect to a main body, if the display unit is changed from an opened state to the closed state, stopping an operation of a touch panel, and after stopping the operation of the touch panel, stopping an operation of a display panel.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a memory device, a CD, a DVD, a hard disk, a blue-ray disk, a semiconductor chip device, a universal serial bus (USB) device, a memory card, a ROM, or the like.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus comprising:
 a main body;
 a display unit configured to be combined with the main body to pivot to be opened and closed and to comprise a touch panel and a display panel;
 a sensor configured to sense opened and closed states of the display unit with respect to the main body by detecting at least one of an angle between the display unit and the main body, a distance between a portion of the display unit and a portion of the main body, and a state of a hinge connecting the display unit and the main body to each other, as the state of the display unit; and
 a controller configured to, when the display unit is changed from the opened state to the closed state, stop an operation of the touch panel at a first time and then stop an operation of the display panel after stopping the operation of the touch panel, the controller configured to differently control an input function of the touch panel and the display function of the panel of the display unit according to a state of the display unit with respect to the main body, and
 wherein the controller deactivates an input function of the touch panel and maintains a display function of the display panel within a period of time when the state of the display unit is detected.

2. The electronic apparatus of claim 1, wherein the sensor senses the opened and closed states of the display unit with respect to the main body by sensing magnetism of a magnet of the display unit.

3. The electronic apparatus of claim 1, wherein the sensor senses the opened and closed states of the display unit with respect to the main body by sensing a relative angle of a hinge that connects the main body and the display unit to each other.

4. The electronic apparatus of claim 1, wherein if the display unit is changed from the opened state to the closed state, the controller stops the operation of the touch panel and stops the operation of the display panel after the closed state is maintained for a predefined time.

5. The electronic apparatus of claim 1, wherein the controller stops the operation of the display panel and informs a basic input output system (BIOS) of the electronic apparatus that the operation of the display unit has been stopped, to enter a sleep mode.

6. The electronic apparatus of claim 1, wherein if the display unit is changed from the closed state to the opened state, the controller resumes the operations of the touch panel and the display panel.

7. The electronic apparatus of claim 1, wherein the controller stops the operation of the touch panel by generating a control signal to block an input of the touch panel or blocking power of the touch panel.

8. The electronic apparatus of claim 1, wherein the controller stops the operation of the display panel by generating a control signal to block an input of a signal output to the display panel or to block power of the display panel.

9. The electronic apparatus of claim 1, wherein the controller is realized as a microcomputer circuit.

10. A method of controlling an electronic apparatus comprising a main body and a display unit configured to be combined with the main body to pivot to be opened and closed and to have a touch panel and a display panel, the method comprising:
 sensing opened and closed states of the display unit with respect to the main body by detecting at least one of an angle between the display unit and the main body, a distance between a portion of the display unit and a portion of the main body, and a state of a hinge connecting the display unit and the main body to each other, as the state of the display unit;
 when the display unit is changed from the opened state to the closed state, stopping an operation of the touch panel at a first time; and
 after stopping the operation of the touch panel, stopping an operation of the display panel and differently control an input function of the touch panel and the display function of the panel of the display unit according to a state of the display unit with respect to the main body, and wherein the stopping comprises deactivating the input function of the touch panel and maintaining a display function of the display panel within a period of time when the state of the display unit is detected.

11. The method of claim 10, wherein a magnetism of a magnet of the display unit is sensed to sense the opened and closed states of the display unit with respect to the main body.

12. The method of claim 10, wherein a relative angle between the main body and the display unit is sensed to sense the opened and closed states of the display unit with respect to the main body.

13. The method of claim 10, wherein after a predefined time elapses from a time when the display unit is changed from the opened state to the closed state, the operation of the display panel is stopped.

14. The method of claim 10, further comprising:
stopping the operation of the display panel and informing a BIOS that the operation of the display panel has been stopped, to enter a sleep mode.

15. The method of claim 10, further comprising:
when the display unit is changed from the closed state to the opened state, resuming the operations of the touch panel and the display panel.

16. The method of claim 10, wherein a control signal to block an input of the touch panel is generated or power of the touch panel is blocked to stop the operation of the touch panel.

17. The method of claim 10, wherein a control signal to block an input of a signal output to the display panel is generated or power of the display panel is blocked to stop the operation of the display panel.

18. A non-transitory computer-readable recording medium to contain computer-readable codes as a program to execute the method of claim 10.

19. An electronic apparatus comprising:
a main body;
a display unit combined with the main body, and having a touch panel and a display panel;
a sensor configured to sense opened and closed states of the display unit with respect to the main body by detecting at least one of an angle between the display unit and the main body, a distance between a portion of the display unit and a portion of the main body, and a state of a hinge connecting the display unit and the main body to each other, as the state of the display unit; and
a controller configured to differently control operations of the touch panel and the display panel of the display unit according to a state of the display unit with respect to the main body, and when the display unit is changed from the opened state to the closed state, stop an operation of the touch panel at a first time and then stop an operation of the display panel at a second time after stopping the operation of the touch panel, the controller configured to differently control an input function of the touch panel and the display function of the panel of the display unit according to a state of the display unit with respect to the main body, and wherein the controller deactivates an input function of the touch panel and maintains a display function of the display panel within a period of time when the state of the display unit is detected.

20. The electronic apparatus of claim 19, further comprising:
a sensor disposed to detect the state of the display unit with respect to the main body,
wherein the sensor detects at least one of an angle between the display unit and the main body, a distance between a portion of the display unit and a portion of the main body, and a state of a hinge connecting the display unit and the main body to each other, as the state of the display unit.

21. The electronic apparatus of claim 19, further comprising:
a sensor disposed to detect the state of the display unit with respect to the main body,
wherein the sensor and the controller are disposed at the main body.

22. An electronic apparatus comprising:
a main body;
a display unit movable with respect to the main body, and having a panel with an input function and a display function; and
a controller configured to differently control the input function of the panel and the display function of the panel of the display unit according to a state of the display unit with respect to the main body,
wherein the controller deactivates the input function of the panel and maintains the display function within a period of time when the state of the display unit is detected.

23. An electronic apparatus comprising:
a main body;
a display unit movable with respect to the main body, and having a panel with an input function and a display function; and
a controller configured to differently control the input function of the panel and the display function of the panel of the display unit according to a state of the display unit with respect to the main,
wherein the controller deactivates the display function and maintains the deactivation of the input function of the panel after a period of time after the state of the display unit is detected.

24. An electronic apparatus comprising:
a main body;
a display unit movable with respect to the main body, and having a panel with an input function and a display function; and
a controller configured to differently control the input function of the panel and the display function of the panel of the display unit according to a state of the display unit with respect to the main,
wherein the input function and the display function are simultaneously activated when the electronic apparatus is turned on, and the input function and the display function are differently deactivated according to the state of the display unit.

* * * * *